US012796826B2

(12) United States Patent
Hille

(10) Patent No.: US 12,796,826 B2
(45) Date of Patent: Nov. 17, 2026

(54) ELECTROMOTIVE LINEAR DRIVE FOR A FURNITURE ITEM, OPERATING METHOD FOR A LINEAR DRIVE, AND FURNITURE ITEM HAVING A LINEAR DRIVE

(71) Applicant: Dewertokin Technology Group Co., Ltd., Jiaxing City (CN)

(72) Inventor: Armin Hille, Bielefeld (DE)

(73) Assignee: Dewertokin Technology Group Co., LTD, Jiaxing City (CN)

(*) Notice: Subject to any disclaimer, the term of this patent is extended or adjusted under 35 U.S.C. 154(b) by 142 days.

(21) Appl. No.: 18/288,120

(22) PCT Filed: May 13, 2022

(86) PCT No.: PCT/IB2022/054461
§ 371 (c)(1),
(2) Date: Oct. 24, 2023

(87) PCT Pub. No.: WO2022/243811
PCT Pub. Date: Nov. 24, 2022

(65) Prior Publication Data
US 2024/0206634 A1 Jun. 27, 2024

(30) Foreign Application Priority Data
May 17, 2021 (DE) ..................... 10 2021 112 749.1

(51) Int. Cl.
*A47C 20/04* (2006.01)
*A47C 1/024* (2006.01)
(Continued)

(52) U.S. Cl.
CPC .......... *A47C 20/041* (2013.01); *A47C 1/0242* (2013.01); *A47C 20/04* (2013.01); *A47C 20/08* (2013.01); *A61G 7/018* (2013.01)

(58) Field of Classification Search
CPC ....... A47C 20/041; A47C 20/08; A47C 20/04; A47C 1/0242; A61G 7/018
(Continued)

(56) References Cited

U.S. PATENT DOCUMENTS

2008/0120779 A1 5/2008 Rawls-Meehan
2014/0191541 A1* 7/2014 Ohta ........................ A61G 5/04 297/118
(Continued)

FOREIGN PATENT DOCUMENTS

CN 103747708 A * 4/2014 ............. A61G 5/127
CN 207585643 U * 7/2018
(Continued)

OTHER PUBLICATIONS

English translation of CN 207585643, Jul. 6, 2018. (Year: 2018).*
(Continued)

*Primary Examiner* — Michael P Nghiem
(74) *Attorney, Agent, or Firm* — Henry M Feiereisen, LLC

(57) ABSTRACT

An electromotive linear drive for a furniture item having a movable furniture part includes a base element, an output element which is displaceable linearly with respect to the base element, and a measuring device embodied as a tilt sensor and designed to ascertain a position of the output element with respect to the base element.

10 Claims, 5 Drawing Sheets

(51) Int. Cl.
*A47C 20/08* (2006.01)
*A61G 7/018* (2006.01)

(58) Field of Classification Search
USPC .......................................................... 702/182
See application file for complete search history.

(56) References Cited

U.S. PATENT DOCUMENTS

| | | | | |
|---|---|---|---|---|
| 2017/0138760 | A1* | 5/2017 | Olsen | B62D 5/008 |
| 2019/0275622 | A1* | 9/2019 | Norum | B23Q 1/44 |
| 2020/0238960 | A1* | 7/2020 | Thompson | A01B 59/002 |

FOREIGN PATENT DOCUMENTS

| | | |
|---|---|---|
| DE | 20 2004 002 924 | 8/2005 |
| EP | 2 737 829 | 6/2014 |

OTHER PUBLICATIONS

English translation of CN-103747708, Apr. 23, 2014. (Year: 2014).*
International Search Report issued by the European Patent Office on Sep. 13, 2022 in International Application PCT/IB2022/054461.

* cited by examiner

ELECTROMOTIVE LINEAR DRIVE FOR A FURNITURE ITEM, OPERATING METHOD FOR A LINEAR DRIVE, AND FURNITURE ITEM HAVING A LINEAR DRIVE

CROSS-REFERENCES TO RELATED APPLICATIONS

This application is the U.S. National Stage of International Application No. PCT/IB2022/054461, filed May 13, 2022, which designated the United States and has been published as International Publication No. WO 2022/243811 A1 and which claims the priority of German Patent Application, Serial No. 10 2021 112 749.1, filed May 17, 2021, pursuant to 35 U.S.C. 119(a)-(d).

BACKGROUND OF THE INVENTION

The invention relates to an electromotive linear drive for a furniture item having a movable furniture part, with the linear drive having a base element and an output element which is displaceable linearly with respect to the base element, and to a measuring device for ascertaining a position of the output element with respect to the base element. The invention further relates to a method for ascertaining a displacement position of an output element relative to a base element in such a linear drive.

Electromotive furniture drives designed as linear drives are used, for example, in beds, armchairs or other furniture items in order to adjust, in particular to swivel, support surfaces or similar movable furniture parts. For this purpose, the furniture item usually has one or more motion fittings to which the linear drive is coupled. When the linear drive is actuated, an output element moves linearly relative to a base element. Linear means hereby that the movement of the output element relative to the base element is along a straight line. Such drives are also referred to as lift drives and the relative movement of the output element with respect to the base element is referred to as lifting movement or simply lift.

The lifting movement is converted by the furniture fitting into a swivel movement or a combined swivel and lift movement. In the case of beds, for example, back and/or foot sections can be swiveled. In the case of recliners, especially so-called relax or TV recliners, the backrest, a seat and also a footrest can often be swiveled and/or extended.

A basic requirement that linear drives must meet for these applications is usually that one or both end positions are detected in order to switch off the drive in these end positions. To detect the end positions, limit switches are often used in the linear drive, which are actuated by the moving output element.

For operation, the linear drives can be moved forward or moved backward, e.g. via a manual operation that is connected to a control device. For more convenient operation of the furniture item, it is also possible to retrieve programmed positions in a user-friendly manner via individual operating commands, for example a keystroke, which are then assumed by the furniture item.

For this purpose, it is necessary that the linear drive not only detects end positions, but also has information about its current setting position. At least the following two basic principles are known for this purpose: In the case of so-called absolute position detection, the current position of the output element relative to the base element, i.e. the current displacement position, can be detected by a position sensor at any time. For example, a potentiometric position sensor can be used which feeds back a resistance value proportional to the set position. The position sensor can be formed by a linear potentiometer, which has a pick-off that is moved with the output element, or also by a rotary potentiometer, the rotational position of which changes proportionally with the position of the output element via a corresponding gear mechanism.

This type of absolute position detection is advantageous because the position information is available at any time, especially also immediately after the furniture item has been put into operation.

As an alternative, so-called incremental position sensors are known which determine a position by summing up differential position change signals. For example, the revolutions of a drive motor of the linear drive can be ascertained and, starting from a known position, a change in position due to the motor revolution can be taken into account. The motor revolution itself can be determined, for example, via a Hall sensor attached to its axis or by evaluating commutation signals from the motor. This type of position detection requires that at least a reference position of the motor is known and that the position change signals are correctly ascertained at all times. Since it cannot be guaranteed, especially when the control unit of the linear drive is not powered, that any motor movement (including one that is caused externally) is detected, a reference run is normally necessary after a power interruption of the furniture item, during which reference run a limit switch is approached for example, which then defines the reference position.

However, such reference runs cannot be carried out without problems in all areas of application for furniture items with electromotive furniture drives, e.g. not for hospital beds that have to be moved to other rooms in hospitals or care facilities and sometimes are occupied by patients, so that the power supply of the control unit and the linear drive is temporarily interrupted. In principle, it would be possible to provide uninterruptible power supplies at least for the position detection system for this time period in order to be able to eliminate a subsequent reference run. However, this increases manufacturing costs and is more maintenance-intensive, since the reliable function of the uninterruptible power supply must be ensured, e.g., by regularly replacing a used rechargeable battery.

For this reason, absolute position sensors are preferable to incremental position sensors in terms of high operational reliability. Absolute position sensors based on potentiometers, however, complicate the structure of the linear drives and, in turn, are prone to fail, since the sliding contact of the potentiometer tends to develop contact problems with increasing operating time.

A furniture item with an electromotive furniture drive is known from the DE 202004002924 U1 publication, in which tilt switches are arranged on movable furniture parts. The drives are stopped when the tilt switches detect that the tilt of the movable furniture part exceeds or falls below a predefined value. In this way, the need for limit switches on the linear drive is eliminated. Absolute position detection for intermediate positions is not possible with the arrangement shown. In addition, the tilt switches that have to be mounted separately on the movable furniture parts increase the complexity in installing the linear drives. The additional cables must also be correctly mounted and routed on the movable furniture parts to prevent them from being jammed by the motion fitting.

It is an object of the present invention to describe a linear drive for a furniture item and a method for its operation, with which the position of the linear drive can be ascertained at any time, without a potentiometric sensor and without additional effort when mounting the linear drive in the furniture item. Furthermore, a furniture item with a linear drive having these advantages is to be created.

SUMMARY OF THE INVENTION

This object is attained by a linear drive, a position detection method and a furniture item with such a linear drive having the features of the respective independent claim. Advantageous configurations and refinements are the subject matter of the dependent claims.

A linear drive of the type mentioned above is characterized according to the invention in that it includes a tilt sensor as a measuring device.

A method according to the invention for determining a displacement position in such a linear drive has the following steps: A plurality of value pairs of displacement positions and tilt angles of the linear drive are determined in a state installed in a furniture item and these value pairs are stored in a memory unit associated with the linear drive. During operation of the linear drive in the furniture item, a current value of the tilt angle is then determined and on the basis of the stored value pairs and the determined tilt angle a current value for the displacement position is determined.

Unlike a swivel drive, a linear drive does not initially have any components whose tilt fundamentally changes when actuated. However, the invention is based on the realization that linear drives often change their own orientation relative to the vertical when actuated due to their use in and coupling with a motion fitting in the furniture item, which can then be ascertained by the tilt sensor and converted into a value for the displacement position of the output element relative to the base element. Normally, there is a monotonic functional dependency between the tilt angle and the displacement position in conventional motion fittings and installation situations of linear drives, so that the displacement position can be unambiguously inferred from a measured tilt angle. The tilt sensor thus acts as an absolute position sensor.

A tilt sensor operates reliably and without mechanical components that are prone to fail. An evaluation unit for determining the current value of the displacement position can be arranged in the linear drive or in a control device for the linear drive coupled to it.

Since the linear drive itself includes the tilt sensor, a sensor signal can be evaluated in the linear drive itself or can be routed via a (anyway existing) connection cable of the linear drive for remote evaluation, e.g. in a control device of the linear drive. This thus eliminates the need for additional wiring during installation.

The value pairs can be determined in a learning phase in the furniture item or can also be determined theoretically in advance from the geometry and kinematics of the motion fitting and the installation situation of the linear drive. Interpolation can be performed between measured value pairs during operation to determine the current displacement position with an angular or travel resolution that is higher than that of the value pairs. The value pairs can also be stored in the form of a function equation or a function equation can be determined approximately from stored value pairs, with the help of which the actual conversion can be performed particularly easily, rapidly and with little computational effort. As an alternative to learning the value pairs or the functional relationship between tilt and displacement position, provision may also be made for their calculation in advance on the basis of a (known) geometry of the furniture item or a furniture fitting to which the linear drive is coupled. Linear drive and control unit can then be set up ready for operation before installation in the furniture item.

The tilt sensor can be arranged in or on the linear drive. When mounted on the linear drive, the tilt sensor is also advantageously suitable for retrofitting a linear drive with an absolute position sensor. The tilt sensor can, for example, be mounted on a standpipe of the linear drive via a mounting clamp. When being integrated into the linear drive, the tilt sensor can advantageously be arranged in a gearbox housing of the linear drive.

In a preferred configuration of the electromotive linear drive, the tilt sensor is a MEMS system, i.e. a Micro-Electro-Mechanical System. This is characterized by a small structure and low manufacturing costs. In principle, a one-dimensional detection of the tilt is sufficient for the application in or on the linear drive, i.e. a measurement of the tilt when pivoting about a predefined axis. When a fixed installation in the linear drive is involved, it may, however, not yet unambiguously be clear about which axis is pivoted during operation. When a subsequent installation is involved, this is usually known, but due to the available positions, it cannot always be guaranteed that the installed tilt sensor will also be pivoted precisely about its measuring axis during operation. It may therefore be advantageous to use a sensor that measures the tilt around 2 or 3 axes and can also flexibly measure tilts around different axes during operation.

A furniture item according to the invention with an electromotive furniture drive includes at least one such linear drive and a control device which is designed to carry out a method described above. The advantages indicated in connection with the linear drive or the method are realized.

BRIEF DESCRIPTION OF THE DRAWING

The invention will be explained in more detail hereinafter with reference to exemplary embodiments with the aid of figures. The figures show.

DETAILED DESCRIPTION OF PREFERRED EMBODIMENTS

Figure 1:
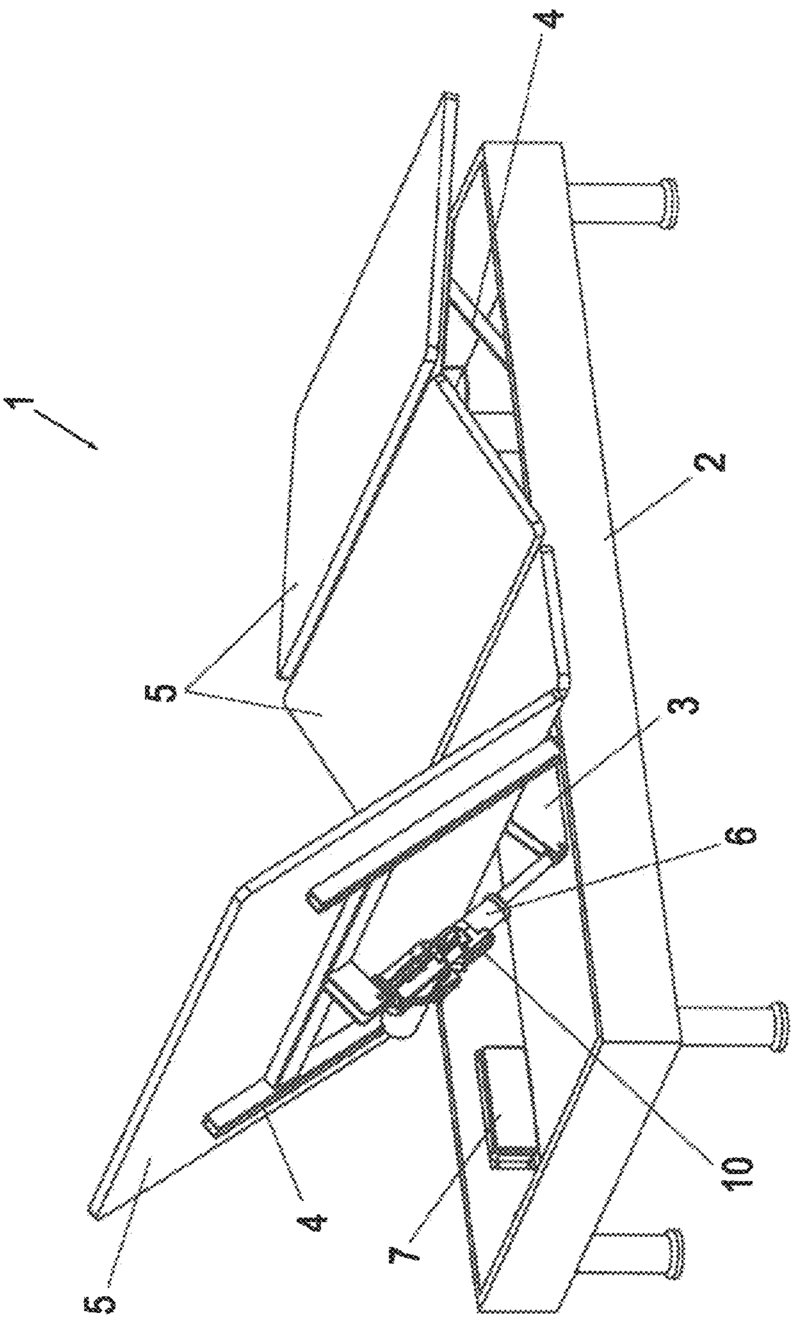
FIG. 1 an exemplary embodiment of a furniture item with an electromotive furniture drive with linear drives and in an isometric view.

FIG. 1 shows a bed 1 as an example of a furniture item with an electromotive furniture drive. The bed 1 includes a frame 2 which supports a plate-shaped support element on which upholstery, e.g. a mattress, can be placed. In alternative configurations, the support element can also be designed as a slatted frame.

In the example shown, the support element is designed in four parts, with one part being firmly connected to the frame 2 and three parts which are mounted such as to swivel relative to the frame and/or to each other. For this purpose, provision is made for a motion fitting with fitting parts 3, 4.

In the example illustrated, the fitting part 3 is mounted stationary on the frame 2 with the aid of the non-movable part of the support element. In relation to this fitting part 3, the fitting parts 4 are mobile and guide or carry movable furniture parts 5, which correspond here to a back part and two leg parts of the support element.

In the present example, two linear drives 6 are provided for moving the movable furniture parts 5, only one of which is visible in FIG. 1 for adjusting the head part. In the linear drives 6, a respective output element is displaced linearly relative to a base element. The linear drives 6 are connected to the base element or the output element with a fitting part 3, 4.

Due to the geometry of the motion fitting, a linear movement of the output element relative to the base element causes the movable fitting part 4 or the movable furniture part 5 to swivel.

Provision is further made for a control device 7, which in the present example is attached to the frame 2 and is connected to the linear drives 6 via cables not illustrated here. The control device 7 is further coupled to an operating unit via which actuation of the linear drives 6 is controlled. The operating unit can be coupled to the control device 7 via a wired or wireless connection. A wireless transmission can be implemented optically, e.g. via infrared light, also via radio. The latter also includes transmission via a WLAN network or a Bluetooth connection.

In the illustrated example, the control device 7 is configured to control both linear drives 6 of the bed 1. In alternative designs, the control device 7 can be integrated in one of the linear drives 6, which then represents a type of higher-level drive that also controls the further drive. It is also conceivable that both (or possibly also several existing) linear drives have their own integrated control devices, which react independently of one another or in coordination with one another to control instructions from an operating unit.

A power supply of the electromotive furniture drive can be provided via a power supply unit integrated in the control device 7 or via an external power supply unit connected to the control device 7 via a low-voltage cable.

According to the application, the linear drives 6 are characterized in that a tilt sensor 10 is integrated in each linear drive 6 or, as in the example illustrated, is mounted on the linear drive 6. The tilt sensor 10 ascertains a tilt of the linear drive 6 relative to the vertical defined by the earth's gravity. Due to the coupling of the linear drive 6 with the fitting parts 3, 4, an actuation of the linear drive 6 is not only connected with a pivoting of the movable furniture part 5, but also with a pivoting of the linear drive 6 and thus of the tilt sensor 10 relative to the vertical.

Assuming in many applications that a functional relationship between the tilt ascertained by the tilt sensor 10 and a displacement position of the linear drive 6, i.e. a relative position of the output element with respect to the base element, is monotonic, a measured tilt can be unambiguously converted into a displacement position, hereinafter also referred to as lift. In this way, a measured tilt value can be converted into position information at any time and thus in the manner of an absolute position sensor.

Figure 2:
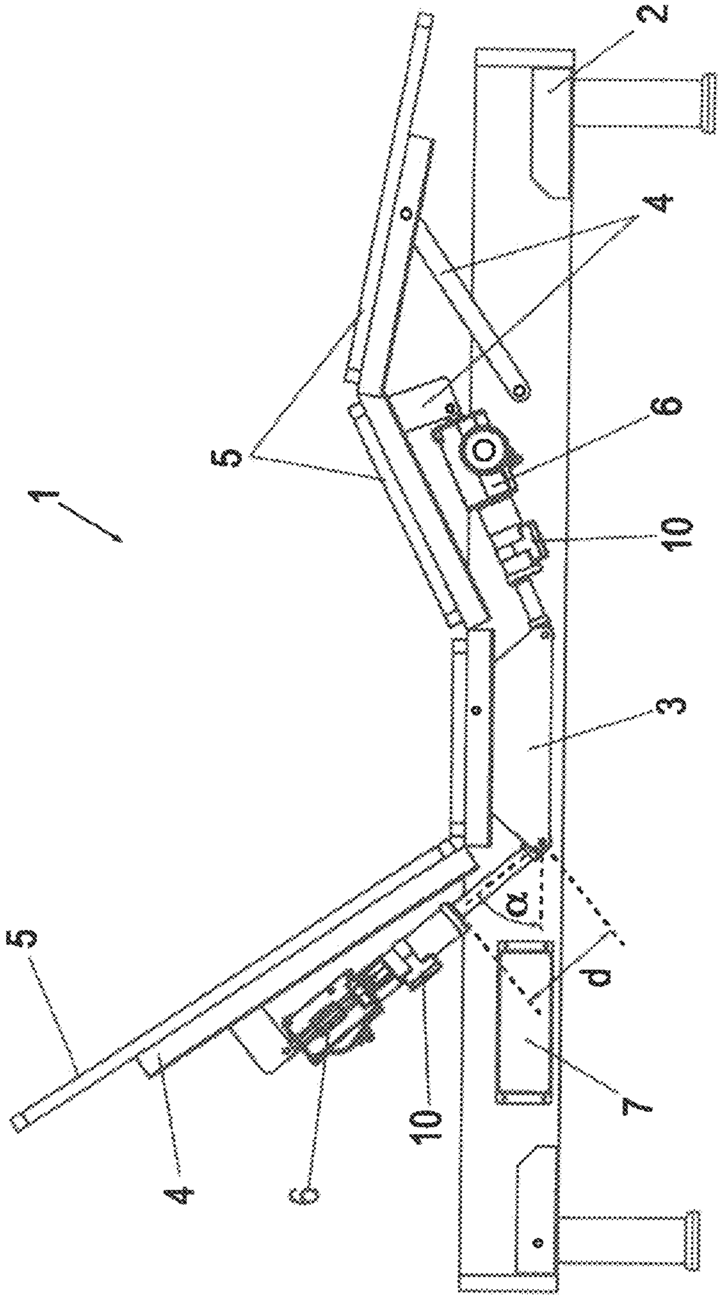
FIGS. 2, 3 each a cutaway side view of the furniture item from FIG. 1 in various positions of its movable furniture parts.
Figure 3:
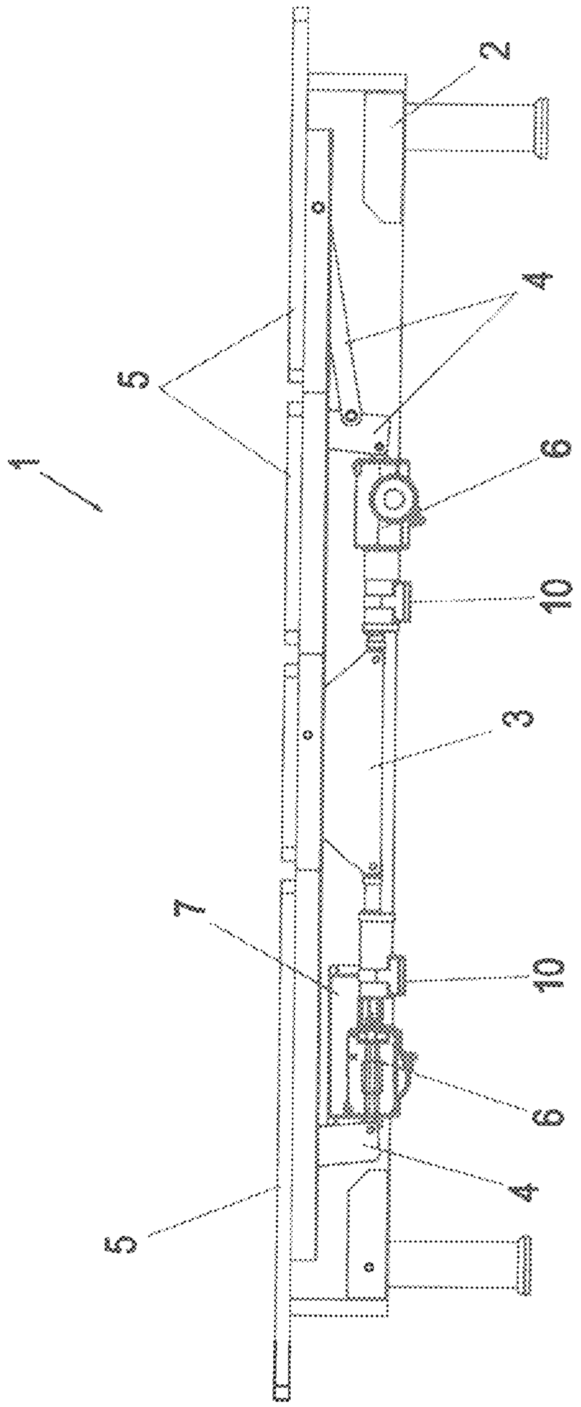

FIGS. 2 and 3 illustrate a sectional side view of the bed 1 in different positions of the movable furniture parts 5. In these representations, the second linear drive 6, which effects an adjustment of the leg parts of the support element, can also be seen.

A tilt angle $\alpha$ and a lift d are shown in FIG. 2 for the linear drive 6 that adjusts the head part. The tilt angle $\alpha$ is shown here in relation to a horizontal. This is purely exemplary. The tilt sensor 10 itself measures with respect to the vertical, with the output value being dependent on the precise installation position of the actual sensor in the tilt sensor 10 and on the mounting orientation of the tilt sensor 10 on or in the linear drive 6. It is apparent that a value measured by the tilt sensor 10 can be related in a simple manner via geometric relationships to the tilt angle $\alpha$ used here for the representation. Likewise, the definition of the lift d as a measure of the position of the output element relative to the base element is purely exemplary. It is only important that the lift d is a measure of the linear movement of the linear drive 6, whereas the tilt angle $\alpha$ characterizes its orientation within the furniture item.

Figure 4:
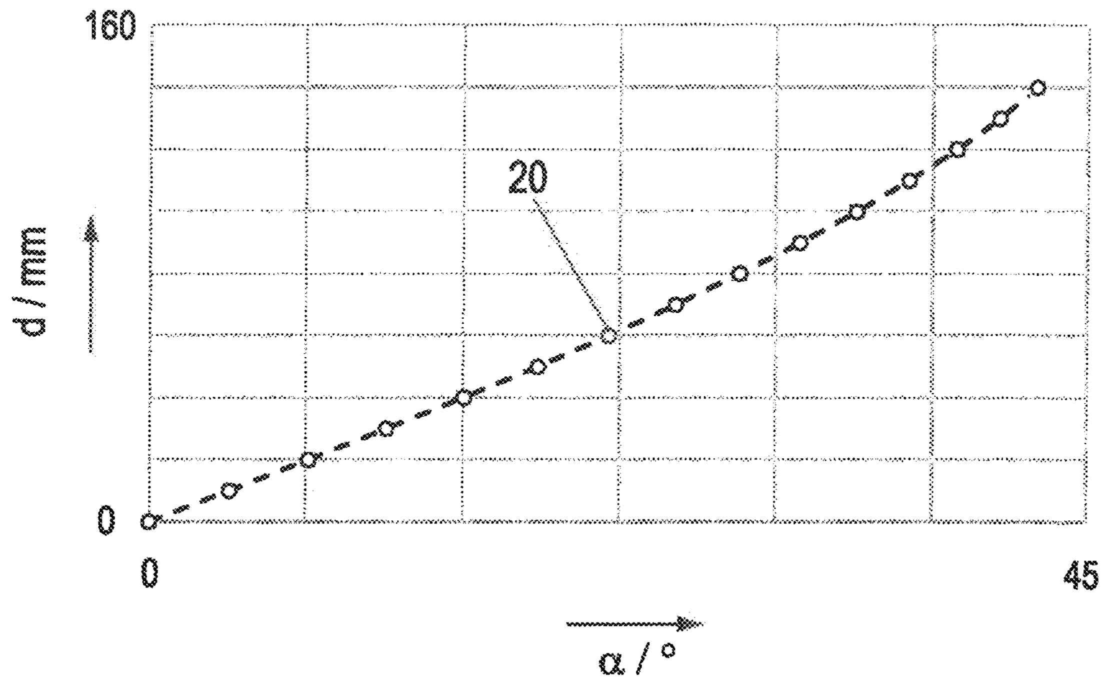
FIG. 4 a schematic diagram of a relationship between swivel angle and lift travel of a linear drive installed in a furniture item.

FIG. 4 shows by way of a schematic diagram the relationship between the measured tilt angle $\alpha$ and the resulting lift d in a curve 20. The tilt angle $\alpha$ is shown in ° (degrees) and the lift in mm (millimeters).

In the present case, a linear relationship is shown over a great angular range, which only becomes steeper at greater angles. Such a curve 20 can be stored in an evaluation unit in the linear drive 6 or the control device 7 and used to convert the tilt angle $\alpha$ measured by the tilt sensor 10 into the lift d. The curve 20 is preferably stored in a non-volatile memory, for example a flash memory, so that it is immediately available even after an interruption of the operating current.

The curve 20 can either be calculated in advance on the basis of the (known) geometry of the fitting and the installation situation of the linear drive 6 in the fitting and stored prior to delivery of the linear drive 6 or the control device 7. As an alternative, provision may be made for a kind of learning phase in which certain angular positions of the movable furniture part 5 are approached manually, e.g. with the aid of a gauge, and the corresponding tilt angles $\alpha$ are measured and stored. The curve 20 can then be interpolated and stored by the control device 7 or the linear drive 6 on the basis of the measured values.

Depending on the fitting and installation situation, the curve 20 may look more complicated than in the example of FIG. 4. As long as the curve is strictly monotonous, i.e. has no local maxima or minima, it is nevertheless possible in any event to clearly assign a lift d to a measured tilt angle $\alpha v$.

In certain cases, the position can even be determined in the presence of a local maximum or minimum. In this case, the magnitude and/or the sign of the 1st derivative of the curve 20 are used. As soon as the linear drive has started up, a change in the tilt angle $\alpha$ can be detected on the basis of the known direction of travel and, optionally, speed, so that it becomes possible to e.g. determine on which side (towards smaller or greater tilt angles $\alpha$) of the maximum or minimum the position of the output element of the linear drive 6 is located. This then also allows the correct position to be determined unambiguously.

Figure 5:
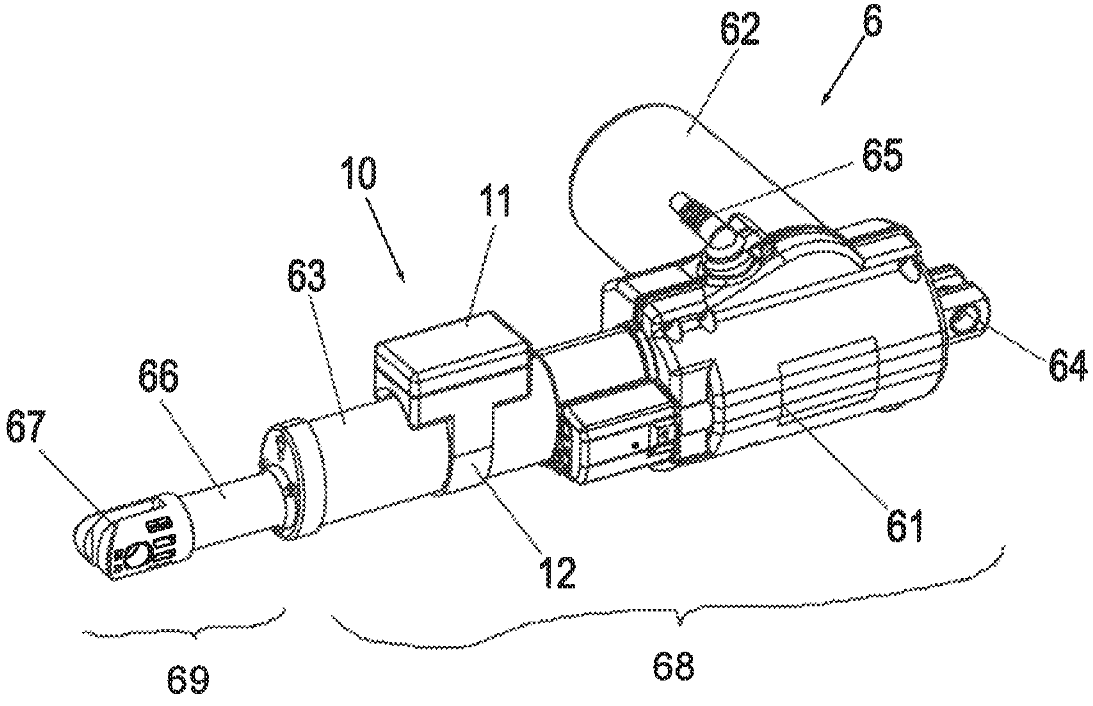
FIG. 5 a first exemplary embodiment of a linear drive for use in a furniture item.
Figure 6:
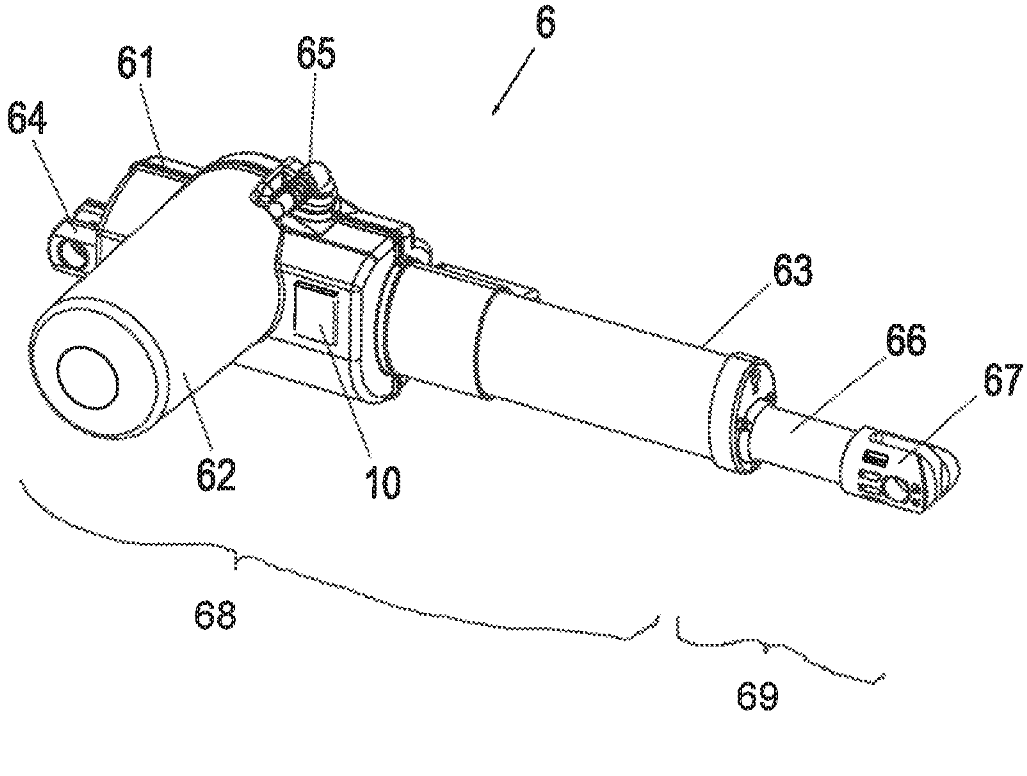
FIG. 6 a second exemplary embodiment of a linear drive for use in a furniture item.

FIGS. 5 and 6 show two linear drives 6, each by way of isometric views, which are equipped with a tilt sensor 10. In terms of basic design, both are identical; they differ only in the mounting type and position of the tilt sensor 10. Both can be used in the previously shown embodiment of the bed 1 according to FIGS. 1 to 3.

The linear drives 6 each have a gearbox housing 61 with a dome under which an electric motor 62 is located. Downstream of the electric motor 62 is a speed reduction gear train with at least one gear stage, for example a worm gear unit. This acts on a threaded spindle gear unit with threaded spindle, which generates a linear motion from the rotary motion of the motor. The threaded spindle is arranged in a standpipe 63 projecting from the housing 61 and also serving as a guide for a lifting tube 66. A clevis as a fastening element 67 is attached to the free end of the lifting tube 66. A comparable clevis as fastening element 64 is located at the opposite end of the gearbox housing 61. Furthermore, an outlet for a connection cable 65 is also formed on the gearbox housing 61.

In the furniture item, the linear drive 6 is mounted with the two fastening elements 64, 67. The lifting tube 66 with the fastening element 67 form the aforementioned output element 69 of the linear drive 6; all other components are associated to the base element 68.

In the exemplary embodiment of FIG. 5, the tilt sensor 10 is mounted in a housing 11 on the standpipe 63 with the aid of a mounting element 12, in this case a type of mounting clamp. In this configuration, the tilt sensor 10 can also be retrofitted as a retrofit element to linear drives that are already available.

In the exemplary embodiment of FIG. 6, the tilt sensor 10 is integrated in the gearbox housing 11 of the linear drive 6.

In both cases, the tilt sensor can be designed as a single-axis or multi-axis acceleration sensor based on MEMS (Micro-Electro-Mechanical System).

What is claimed is:

1. A method for ascertaining a displacement position of an output element of a linear drive relative to a base element of the linear drive for a furniture item having a movable furniture part, wherein the base element is attached to a movable part of the furniture item and the output element is attached to a stationary part of the furniture item and is displaceable linearly with respect to the base element, a tilt sensor as a measuring device for ascertaining the displacement position of the output element with respect to the base element, the tilt sensor arranged on or in the linear drive, and a control device coupled to the linear drive, the method comprising:

determining, in a learning phase, several value pairs of displacement positions and tilt angles of the linear drive in a state installed in the furniture item, wherein the tilt sensor measures the tilt angles and the control device determines the displacement positions;

storing the value pairs in a memory unit of the control device;

operating the linear drive with the control device;

measuring with the tilt sensor a current value of a tilt angle of the linear drive during the operation of the linear drive in the furniture item; and determining from the measured current value of the tilt angle with the control device a current displacement position of the output element with respect to the base element by interpolating between the stored value pairs.

2. The method of claim 1, further comprising determining the current value of the displacement position by an evaluation unit arranged in the linear drive or in the control device.

3. A furniture item, comprising:

a stationary furniture part; and a movable furniture part configured to pivot with respect to the stationary furniture part;

an electromotive furniture drive comprising a linear drive comprising a base element attached to the movable furniture part, an output element which is displaceable linearly with respect to the base element and attached to the stationary furniture part, and a measuring device embodied as a tilt sensor and designed to ascertain a tilt of the linear drive, the tilt sensor arranged on or in the linear drive; and a control device coupled to the linear drive and configured to carry out the method as set forth in claim 1.

4. The furniture item of claim 3, wherein the tilt sensor is mounted on the linear drive.

5. The furniture item of claim 3, wherein the linear drive comprises a standpipe, and a mounting clamp designed to mount the tilt sensor on the standpipe.

6. The furniture item of claim 3, wherein the tilt sensor is integrated in the linear drive.

7. The furniture item of claim 3, wherein the linear drive comprises a gearbox housing, said tilt sensor being arranged in the gearbox housing.

8. The furniture item of claim 3, wherein the tilt sensor is a MEMS system.

9. The furniture item of claim 3, wherein the tilt sensor is designed to measure a tilt relative to at least 2 axes.

10. A method for ascertaining a displacement position of an output element of a linear drive relative to a base element of the linear drive for a furniture item having a movable furniture part, wherein the base element is attached to a movable part of the furniture item and the output element is attached to a stationary part of the furniture item and is displaceable linearly with respect to the base element, a tilt sensor as a measuring device for ascertaining the displacement position of the output element with respect to the base element, the tilt sensor arranged on or in the linear drive, and a control device coupled to the linear drive, the method comprising:

calculating several value pairs of displacement positions and tilt angles of the linear drive in a state installed in the furniture item based on a geometry of the furniture item or a furniture fitting to which the linear drive is coupled;

storing the value pairs in a memory unit of the control device in a form of a function equation, wherein the function equation is determined by approximation from the stored value pairs;

operating the linear drive with the control device;

measuring with the tilt sensor a current value of a tilt angle of the linear drive during the operation of the linear drive in the furniture item; and determining from the measured current value of the tilt angle with the control device a current displacement position of the output element with respect to the base element by interpolating between the stored value pairs according to the function equation.

* * * * *